United States Patent [19]

Bachmann et al.

[11] Patent Number: 5,355,225
[45] Date of Patent: Oct. 11, 1994

[54] VIDEO SIGNAL COLOR CORRECTION WITH DUAL FUNCTION MEMORIES AND COLOR WINDOW

[75] Inventors: Peter Bachmann, Aschaffenburg; Dieter Poetsch, Ober-Ramstadt, both of Fed. Rep. of Germany

[73] Assignee: BTS Broadcast Television Systems GmbH, Darmstadt, Fed. Rep. of Germany

[21] Appl. No.: 843,552

[22] Filed: Feb. 28, 1992

[30] Foreign Application Priority Data

Feb. 28, 1991 [DE] Fed. Rep. of Germany ....... 4106306

[51] Int. Cl.⁵ .................................................. H04N 9/64
[52] U.S. Cl. ..................................... 348/645; 348/649
[58] Field of Search ........................ 358/27, 28, 29, 30; 340/703; H04N 9/64, 9/68, 9/69

[56] References Cited

U.S. PATENT DOCUMENTS

| 3,558,806 | 1/1971 | Monaham et al. | 358/30 |
|---|---|---|---|
| 4,523,221 | 6/1985 | Chin et al. | 358/21 R |
| 4,805,016 | 2/1989 | Kato | 358/98 |
| 4,809,059 | 2/1989 | Flamm et al. | 358/27 |
| 4,916,531 | 4/1990 | Genz et al. | 358/75 |
| 4,951,127 | 8/1990 | Mehrgardt et al. | 358/28 |
| 4,951,127 | 8/1990 | Mehrgardt et al. | 358/28 |
| 5,111,281 | 5/1992 | Sekiguchi | 358/28 |

FOREIGN PATENT DOCUMENTS

| 0160548 | 11/1985 | European Pat. Off. | |
| 3325143A1 | 1/1984 | Fed. Rep. of Germany | |
| WO87/06419 | 10/1987 | PCT Int'l Appl. | |
| 2191904 | 12/1987 | United Kingdom | H04N 9/64 |
| 2233187A | 1/1991 | United Kingdom | H04N 1/46 |
| 02207 | 3/1988 | World Int. Prop. O. | H04N 9/64 |
| 91039 | 3/1991 | World Int. Prop. O. | H04N 9/64 |

OTHER PUBLICATIONS

J. Monahan et al, "Color Correction Techniques for Television Cameras", Sep. 1969, pp. 696–700, Journal of the SMPTE, vol. 78.

H. Schonfelder, Digitale HDTV-Bildmischung, Fernseh und Kino-Technik, vol. 43, No. 6, (1989).

*Primary Examiner*—James J. Groody
*Assistant Examiner*—Glenton B. Burgess
*Attorney, Agent, or Firm*—Frishauf, Holtz, Goodman & Woodward

[57] ABSTRACT

Memories are provided for correction signal values respectively for a hue signal, a saturation signal and a luminance signal derived from a digital color television signal. Each of the memories consists of two memory units which are alternately used for storing new correction signal values and for reading out previously stored correction signal values. The corrected signal values are modified by a key signal, if present, in each case and are then supplied to calculation circuits to each of which a signal derived from the saturation signal is applied. The resulting fully corrected hue and saturation signals are converted back into color difference signals, but the finally corrected luminance signal requires no conversion. The correction signal values are supplied from a computer into which control magnitudes can be entered to produce them. These control magnitudes can be used to define corner points of a deflected line function from which the raw correction signals are derived. Monitors and cursors are used to facilitate correct entry of control magnitudes.

16 Claims, 5 Drawing Sheets

VIDEO SIGNAL COLOR CORRECTION WITH DUAL FUNCTION MEMORIES AND COLOR WINDOW

CROSS-REFERENCE TO COPENDING APPLICATION

Application of Peter Bachmann, Mike Christmann and Dieter Poetsch, Ser. No. 07/843,551, filed Feb. 28, 1992 (now U.S. Pat. No. 5,282,021).

This invention concerns a method and apparatus for color correction of a video signal in a manner dependent upon the particular color hue represented in the video signal at the time and in further dependence upon setting or control values that are manually settable and stored for use.

For color correction of television signals it is known to modify the amplitude of color difference or color value signals. Such amplitude modification is provided by the so-called secondary color correction which is described in U.S. Pat. No. 3,558,806 and in the article by J. Monahah and R. Discherr entitled "Color Correction Techniques for Television Cameras" and published in the Journal of the SMPTE, Vol.78, Sept. 1969, pp. 696 to 700. That secondary color correction is performed in a manner dependent on the color hue represented in the very portion of the signal that is to be corrected. For six different reference color hues there are produced six respective corrections for the color hue and six for the saturation. The correction signals are applied to the color value signals of those colors of a video signal which appear on either side of the particular reference hue, so that the result is that the reference color sectors overlap the usual color sectors. The magnitude of the correction signals diminishes somewhat linearly with increasing difference between the hue being corrected and a neighboring reference hue. Furthermore, similar methods are known in which color difference signals (R-Y, B-Y) rather than color component signals (R,G,B) are corrected.

In these known methods those sectors of the color circle for which settings or control values can be provided are fixedly predetermined. If for example a color is to be modified which is reached by the setting values of two neighboring sectors, multiple operations of a keyboard or other entry device for the setting or control values is necessary before the correction of the color to be corrected is completed. From such a correction it is possible to modify other colors in an undesired way.

SUMMARY OF THE INVENTION

It is an object of the present invention to provide a method and apparatus for color correction of video signals in which the correction is to a great extent compatible with the requirements of the picture content represented at the time. In particular, any desired color hue should be capable of subjection to a suitable correction.

Briefly, correction signals are stored in at least one memory in a manner dependent on (addressable by) both the hue and the setting or control values. A digital color hue signal obtained from the video signal to be corrected and one or more control magnitudes are supplied to the address inputs of at least one memory and a raw or provisional correction signal thus obtained from memory is supplied to a calculating circuit which produces a refined or definite hue correction signal.

In a further refinement of the method, after a change of the setting or control values, correction signals which are produced are written into a first memory portion, while a second memory portion is addressed by the digital color hue signal and supplies correction signals to a calculating circuit. In the case of a further change of the setting or control values, the again changed setting or control values are written into the first memory, while the second memory is addressed by the digital color hue signal and provides the correction signals to the calculating circuit.

BRIEF DESCRIPTION OF THE DRAWINGS

Further features and provisions of the invention are best described by way of an illustrated example referring to the annexed drawings, in which.

The same parts are designated by the same reference numerals in the several figures.

DESCRIPTION OF THE ILLUSTRATED EMBODIMENT

Figure 1:
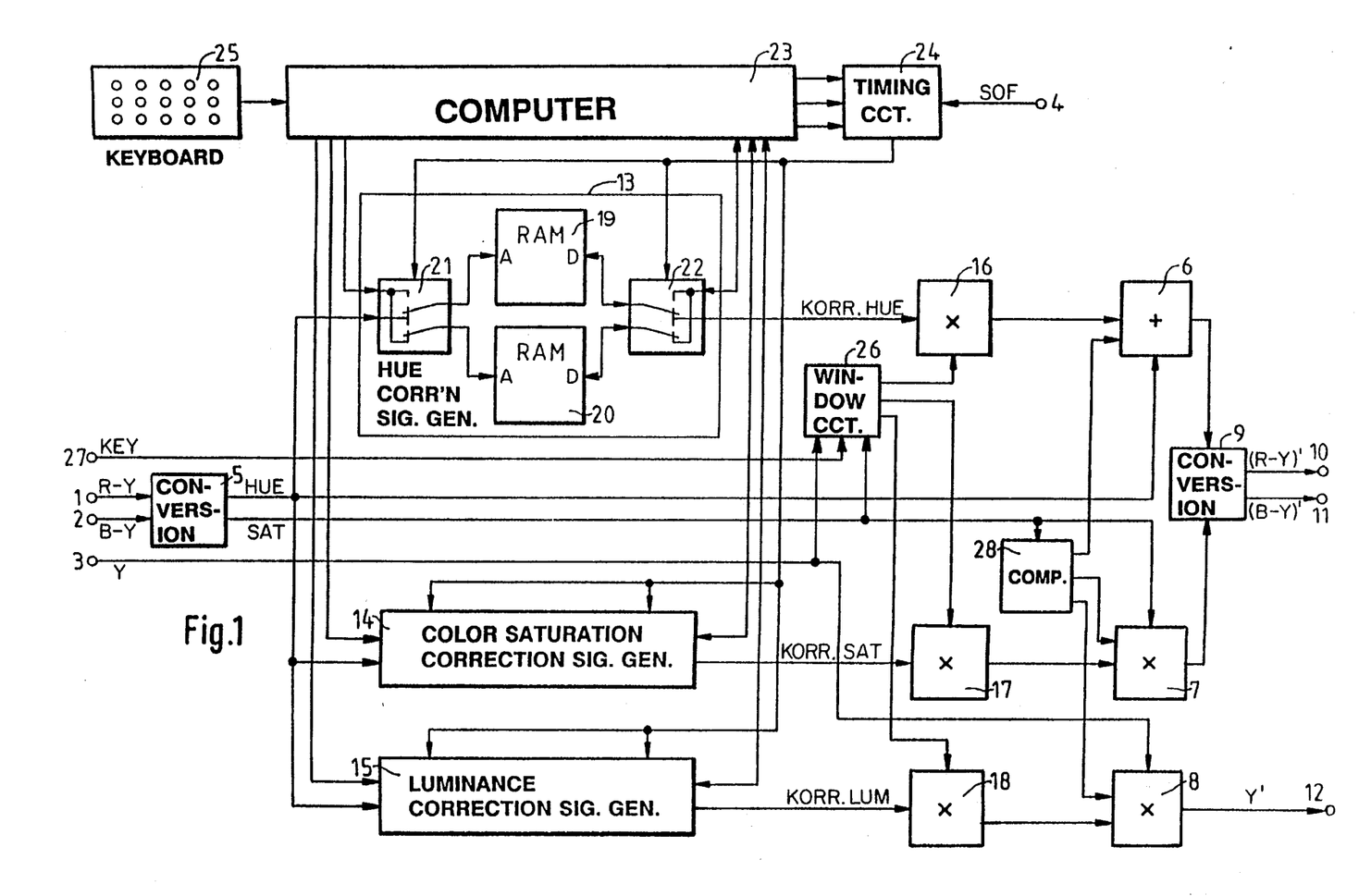
FIG. 1 is a circuit block diagram of a system for carrying out the method of the invention.

The system of FIG. 1 is supplied over its inputs 1, 2 and 3 respectively with color difference signals R-Y and B--Y and a luminance signal Y. In addition, an input 4 is provided for a start-of-frame signal SOF which designates every time of beginning of a picture. The color difference signals are converted into a saturation signal SAT and a color hue signal HUE in a known conversion circuit 5 that does not need any further description. Calculating circuits 6, 7 and 8 are respectively provided for the signals HUE, SAT and Y, in which, respectively, the HUE signal is added to a hue correction signal KORR.HUE while the color saturation signal KORR.SAT and a luminance correction signal KORR.LUM are both multiplied by the respective signals which are to be corrected. The corrected color hue signal HUE' and the corrected saturation signal SAT' are converted into color difference signal (R-Y)' and (B-Y)' in a known converter circuit 9 which makes available the corrected color difference signals at the respective outputs 10 and 11. The corrected luminance signal Y' is made available at the output 12.

The video signals appearing in the system of FIG. 1 are 8-bit wide digital video signals. Of course the invention can also be practiced with digital video signals which are quantized more finely or more coarsely. Coding of the color hue signal HUE can advantageously be performed so that the entire range of values of the digital signal (0 ... 255 in the case of 8-bit coding) corresponds to the full color circle. By ignoring any overflow it is then possible to produce any desired angular addition.

The circuits 13, 14 and 15 are provided for generating the correction signals. Since these circuits are identical with each other, only the circuit 13 in FIG. 1 is shown in detail for simplifying the presentation of this subject matter. Between the outputs of the circuits 13, 14 and 15 which already supply correction signals and the inputs of the calculation circuits 6, 7 and 8 there is in each case interposed an additional calculation circuit 16, 17, 18 which makes possible a modification of the correction signal produced by the circuit 13, 14 or 15 as the case may be. For this modification there are supplied, to the additional calculation circuits 16, 17 and 18, signals that are derived by means of a circuit 26 from a signal present at an input 27 of the system, which in the case of the example of FIG. 1 is a key signal. In this way it is for example possible to limit the color correction to the portion of the picture which is described by the key signal. If for example the key signal represents the contour of an object located in front of a background, then to distinguish the portions of the picture representing the background the circuit 26 can supply to the calculating circuits 16, 17, 18 a signal 1, while for the portions of the picture representing the foreground object a signal 0 can be supplied. In that way color correction of the signal signifying the pictured object are suppressed while the correction signals established by means of the circuits 13, 14 and 15 for the background remain unaffected finely Additional details and application possibilities of the circuit 26 will be further explained in connection with FIGS. 4 to 8.

The calculating circuits 6, 7 and 8, as well as the additional calculation circuits 16, 17 and 18 can be implemented in a simple way with arithmetic components available in the commercial market. The significance and details of the calculations in the circuits 6, 7 and 8 is explained in the copending application cross-referenced at the beginning of this specification.

The circuits 13, 14 and 15 for generating the correction signals in each case contain two random access memories 19, 20 for storing the correction signals in a manner dependent upon the color hue signal HUE. Functions of the same type as the stored raw correction signals are shown by way of example in FIGS. 3A, 3B, 3C and 3D. The address inputs A and the data inputs and outputs D of the RAMs 19 and 20 are each connectable by changeover selector switches 21 and 22 to a computer 23 to which also the output of the circuit 5, which provides the color hue signal HUE, and the inputs of the respective additional calculation circuits 16, 17 and 18 are connectable either through one of the circuits 14 and 15 or through one of the switches 21 and 22.

The selector switches 21 and 22 are controlled in such a way that in every case one of the RAMs is utilized for producing the correction signals, while in the other RAM new correction signal values furnished by the computer are written in. In the illustrated position of the selector switches 21 and 22 the color hue signal HUE, for example, is supplied to the address inputs of the RAM 19, so that one of the correction signals KORR.HUE is taken from the data input/output ports of the RAM 19 and is supplied to the input of the additional calculation circuit 16. At the same time the RAM 20 can be addressed over the selector switch 21 by the computer 23 for writing in new correction values.

In order to avoid undesirable interference in switching over between the RAMs, the switches 21 and 22 are controlled by a logic circuit 24 so that after a change of correction values carried out by the computer and at the next appearance of the following signal SOF (start of field or start of frame), the switching over takes place during the vertical frequency blanking interval. In that way the result is obtained that a correction immediately after a new setting of control values is promptly effective and can be observed on a monitor connected to the system.

A keyboard field 25 is connected in a known way to the computer 23 which in accordance with one embodiment of the invention has the capability of setting corrections for individual sectors of the color circle respectively for the hue, saturation and luminance. Such a keyboard control for a computer is in itself known and need not be further described here. By the use of RAMs and of the computer it is even possible, within the scope of the invention, to set any desired function for setting of correction values for every single quantization step of the color signal HUE.

For colorless setting of the picture (SAT = 0) a secondary color correction is not possible and it can even happen that because of noise in the chrominance signal, errors in the correction signal will occur. For this reason the circuit 28 is provided in the embodiment shown in FIG. 1 which disables the calculation circuits 6, 7 and 8 by circumventing them for the case in which SAT is equal or very close to 0. In that case the signals HUE, SAT and Y pass through the circuits 6, 7 and 8, without modification. Circumvention of the calculation circuits can be provided in a simple way by passing signals around the calculation circuits by means of suitable change-over switches (not shown) located in or near the calculating circuits and controlled by respective outputs of the circuit 28.

A further development of the invention makes possible a multiple color correction with an extremely simple operation of a keyboard or the like. An example of an embodiment of this further development is shown in FIG. 2 (again by way of a circuit block diagram) in which, with the exception of the computer 23, the keyboard field 25 and the circuits 5 and 9, the circuit blocks of FIG. 1 are combined into a single circuit block 31.

Figure 2:
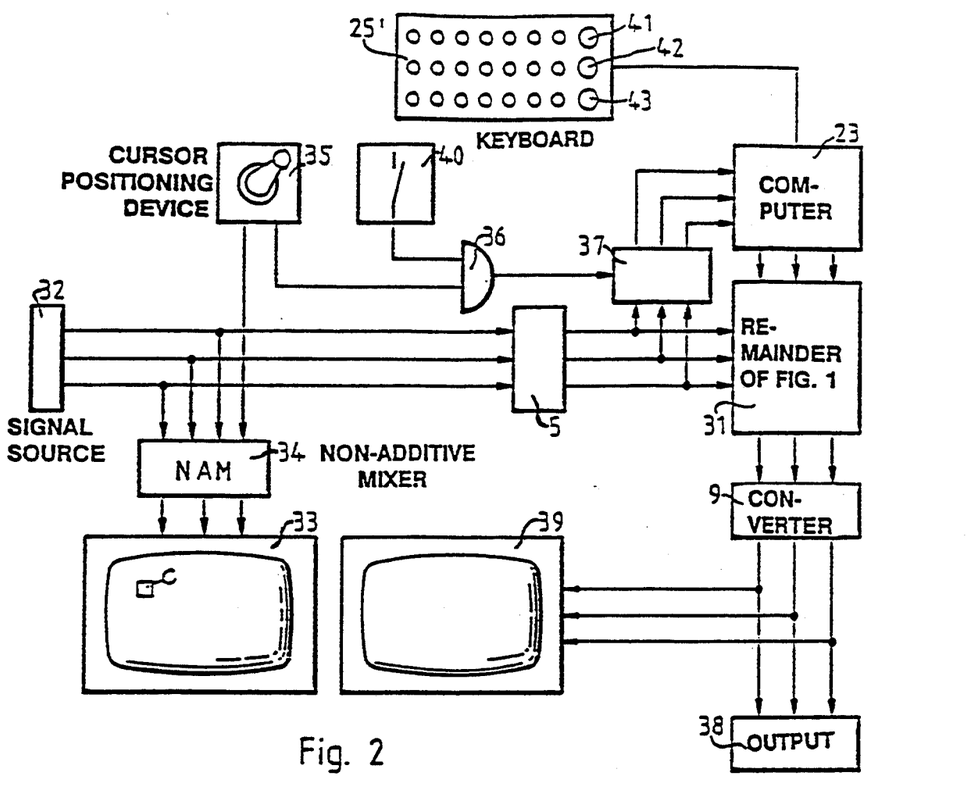
FIG. 2 is a block diagram of a system for facilitating the control of the system of FIG. 1 by an operator.

At 32 the signals to be corrected are supplied to the system shown in FIG. 2 and are made visible by means of a first monitor 33. In the lines supplying the video signal to the first monitor 33 a non-additive mixing circuit 34 is inserted by means of which a cursor C can be mixed into the video signals. In the illustrated embodiment the cursor has the shape of a frame by which the color of the picture detail to be identified by the cursor remains visible.

The video signals representing the cursor C are generated by means of a positioning apparatus 35 that is in itself well known, which is synchronized with the supplied signals. This further generates a gate signal which takes on the value "1" only when the video signals represent the marked picture detail. This gate signal is supplied through an AND circuit 36 to the control input of an input register 37 of the computer 23. The corrected video signals can be obtained from an output 38 and shown on a second monitor 39.

The performance of the correction with the system of FIG. 2 can now take place in such a way that by means of the positioning device 35 the cursor C can be moved to a correction-requiring location in the picture. By actuation of a key 40 the AND gate 36 can be opened for the signal represented on the screen surface framed by the cursor C, whereby the signals HUE and if desired also SAT and Y corresponding to this selected picture detail can be read into the computer 23 through the input register 37. For the hue signal thus selected the corrections relating to the hue signal, the saturation signal and the luminance signal can be produced on the keyboard and display 25, while the effect of the correction can be observed on the second monitor 39. This correction can be carried out for any desired number of hue values in succession while the control elements 41, 42 and 43 are in each case automatically correlated to the particular hue.

Since practical operation of the method of the invention correction values can be set only in the case of a few selected hue values, the raw correction values thus set serve as support values for functions generated by the computer. The computer can carry out a simple linear interpolation between the support values 51 to 54 shown in FIG. 3B. There are, moreover, also other curve types that can be realized by means of a corresponding program for the computer, for example FIG. 3C.

Figure 3A:
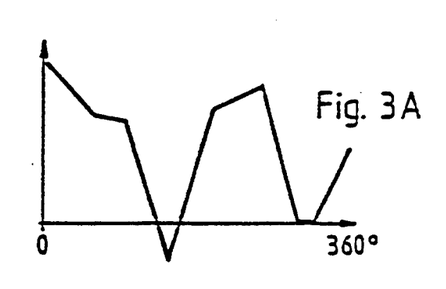
FIG. 3A is a diagram showing amplitude plotted against the angular position in the color circle of a function that may be stored in memory in the system of FIGS. 1 and 2.
Figure 3B:
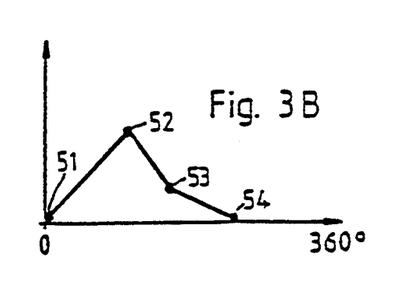
FIG. 3B is a diagram like FIG. 3A of another function that may be stored in the system of FIGS. 1 and 2.
Figure 3C:
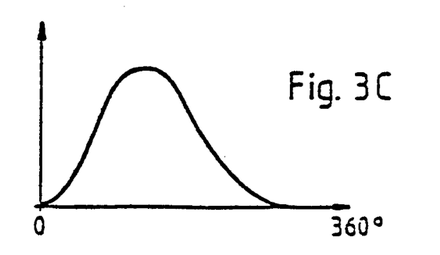
FIG. 3C is a diagram like FIG. 3A of a third function that may be stored in the system of FIGS. 1 and 2.
Figure 3D:
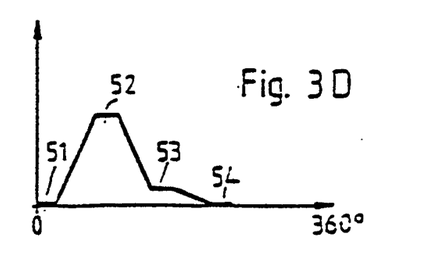
FIG. 3D is a diagram like FIG. 3A of a fourth function that may be stored in the system of FIGS. 1 and 2.

In order to make possible the same correction of colors which differ only slightly in their hues, a curve region that run flat in the neighborhood of the support values 51 to 54 can be generated, as is shown for example in FIG. 3D. By a corresponding program in the computer the generation of a flat portion of the correction curve can also be produced by setting a correction for a color hue selected by the cursor and by then immediately shifting the cursor to another picture detail and actuation of the key 38 enter into the computer all the hue values which should be subjected to the same correction.

A further simplification of operation control is possible in which after writing in of the signal values of the picture details marked by the cursor, the cursor C is moved to another picture detail which has the color which the first marked picture detail should take on after the correction. By repeated actuation of a key 44 the signal values of the second picture detail can likewise be written into the computer. By a comparison of both signal values it is then possible in a simple manner to calculate the necessary correction values and to transfer them to the correction circuit 31.

By changing of a correction value of one color component there occurs in general a visual change of another color component. If for example the luminance in a selected sector is changed, a change of the color saturation becomes observable on the picture screen. In order to avoid this effect, the following compensation can be made to take place in the computer

KORR.SAT1 = KORR.SAT0·KORR.LUM wherein KORR.LUM is the correction value set for the luminance, KORR.SAT0 is the previously set correction value for the saturation and KORR.SAT1 is the compensated correction value for the saturation that is supplied to the correction circuit.

Besides the already described use of the circuit 26 by which by means of a key signal a distinction is made between a picture portion to be corrected and a picture portion not to be corrected, the window circuit 26 (FIG. 1) can also be used for the purpose described in what follows. Thus for example the composite picture already produced by a patterned mixture of two video signals affected with various color errors, the mixing having been performed by means of a key signal, can be subsequently corrected. In order to be able to supply different correction signals to the respective components, the circuit 16 should be elaborated into a fading circuit to which, in addition to the control signal from the circuit 26, two different insertable correction signals can be supplied. Most conveniently recourse should be made to a key signal which is present on a magnetic tape recording as a channel supplementary to the normal video signals.

Figure 4:
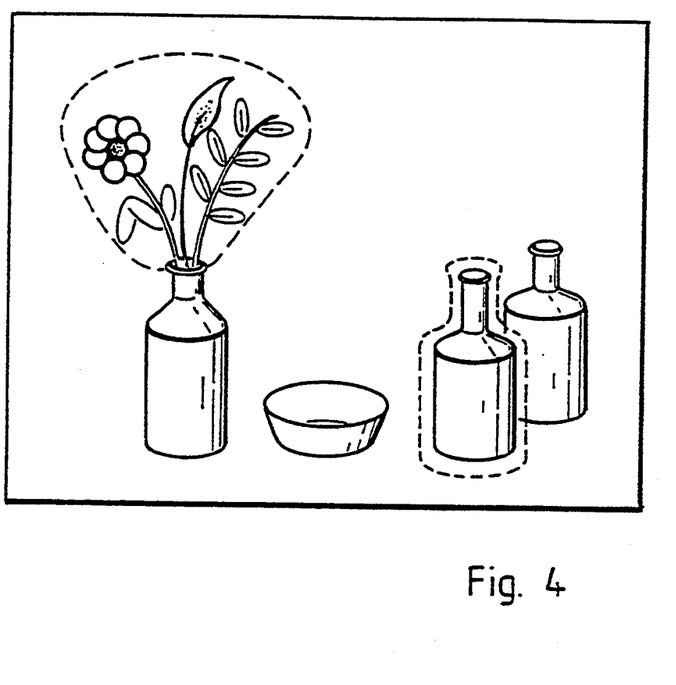
FIG. 4 is a picture on a television screen for explanation of a so-called keying procedure for inserting one picture in another.
Figure 5:
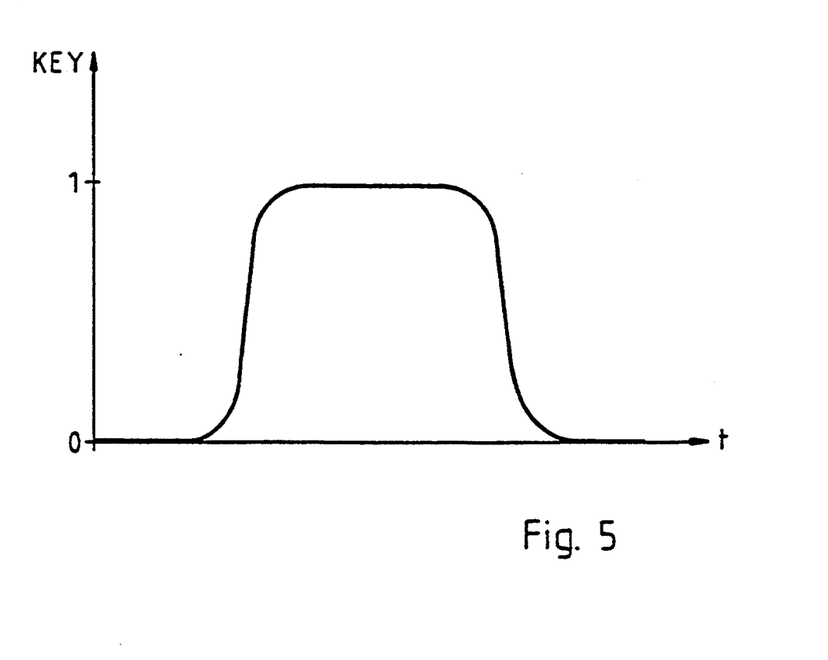
FIG. 5 is a time diagram of a key signal used in a keying procedure.

Furthermore, a selectable region can be excepted from the color correction by means of the key signal or can be furnished with replacement by another color correction. The definition of this region can be established in a simple way by a light pen, a digitalizing tablet or a contour computer. Examples for such key signals or contour signals are shown in FIG. 4 in the form of a screen picture. The key signal is provided with a trapezoidal profile (soft key) to avoid disturbances at he boundaries of the key region, as is shown in FIG. 5.

In the embodiment of FIG. 1 the key signal is furnished to the circuit 26. The saturation signal SAT is furnished to the circuit 26 and also to the comparator circuit 28 for distribution of a by-passing signal to the final calculation circuits 6, 7 and 8 when the saturation signal SAT is approximately zero. The luminance signal Y is supplied to the circuit 26 but otherwise only to the final calculation circuit 8. As a result of the outputs of the circuit 26 a further selection of the correction region according to the criteria of luminance and saturation should be made possible. Thus, for example, two objects of the same color which are differently illuminated can be subjected to separate color correction. When the color saturation is minimal, by-passes in the calculation circuits activated by the comparator circuit 28 allow the signals KORR.HUE, KORR.SAT and KORR.LUM to pass through the respective circuits 6, 7 and 8 without further modification, as already explained.

Figure 6A:
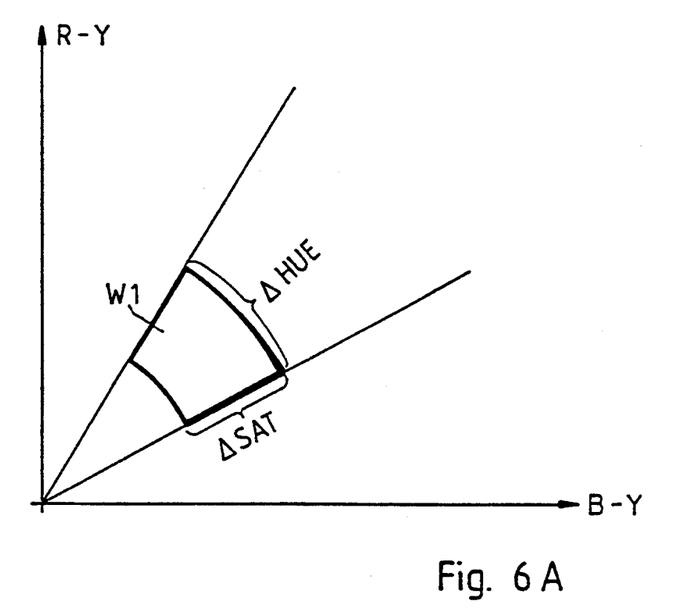
FIG. 6A is a graph with color difference signals as the coordinates which shows a two-dimensional range of correction in saturation and hue.
Figure 6B:
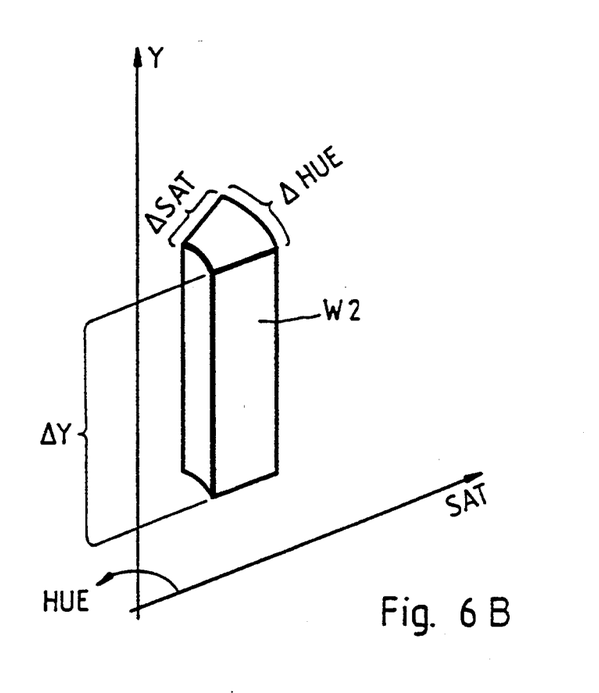
FIG. 6B is a three-dimensional graph with the axes of luminance, saturation and hue showing a three-dimensional range of correction.

FIG. 6A shows a boundary limited by a saturation window W1. In this case the limitation takes place in the direction of the saturation by means of the circuit 26 and the additional calculation circuits 16, 17 and 18 of FIG. 1, while the limiting of the correction in the direction of the hue is carried out by corresponding control of the circuits 13, 14 and 15. If the luminance is now added in, then the three-dimensional correction space is obtained which is shown in FIG. 6B.

Figure 7:
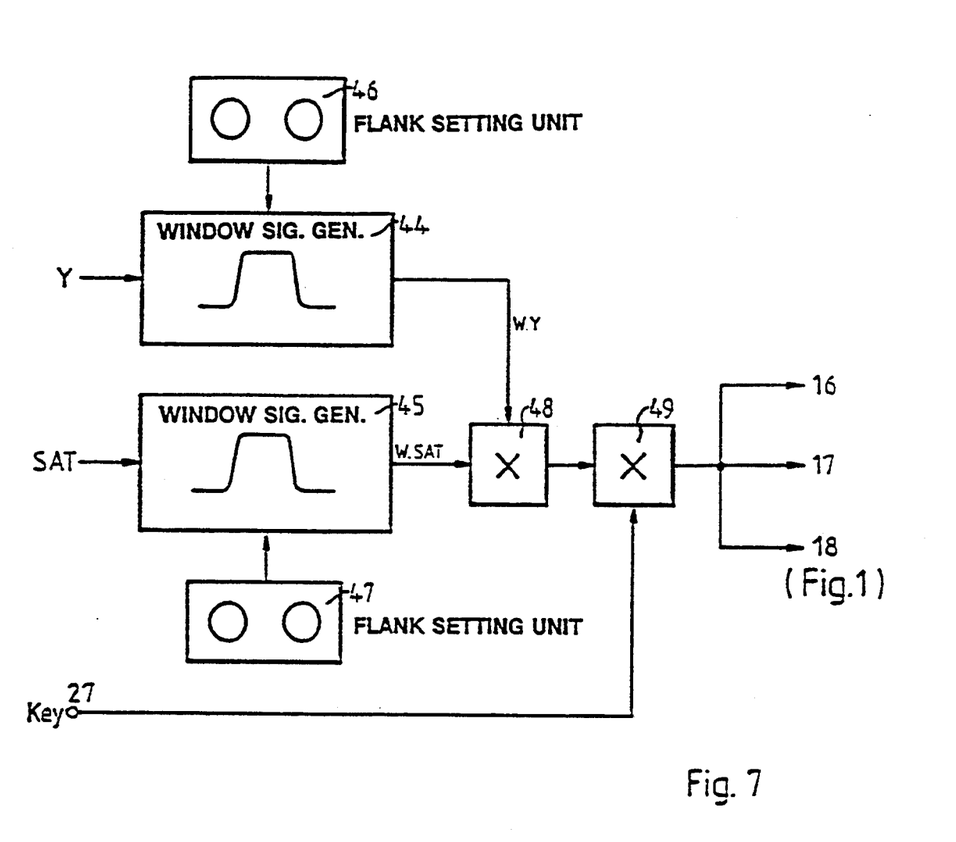
FIG. 7 is a block circuit diagram of the window signal circuit of the system of FIG. 1.
Figure 8:
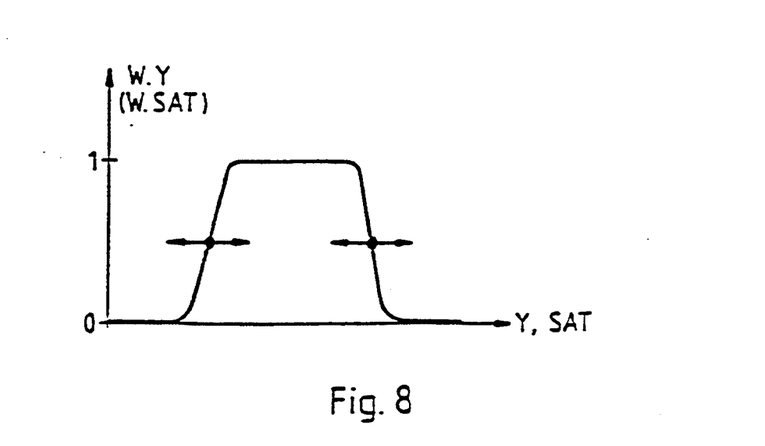
FIG. 8 is a time diagram of a signal in the circuit of FIG. 7.

FIG. 7 shows, in the form of a circuit block diagram, an embodiment of the window circuit 26 of FIG. 1. The luminance signal Y and the saturation signal SAT are respectively supplied to circuits 44 and 45 for generation of a window signal W.Y or W.SAT as the case may be. These circuits in each case produce a signal which is dependent in a manner shown in FIG. 8 from the input signal Y or the input signal SAT as the case may be. For small values of the input signal the output signal is 0. In the region of a first value that can be set, the output signal gradually rises to 1, then remains there until a further transition region is reached which is likewise capable of being set into the system, before sinking back to 0. The setting of the flanks of the signal W.Y or Y.SAT, as the case may be, is indicated by the double-headed arrows in FIG. 8 and is produced by setting in units 46 and 47 of FIG. 7, each of which as a setting element, for example a knob for each of the lower and upper flanks.

At the outputs of the circuits 44 and 45 there are connected the inputs of a first multiplier 48, the output signal of which and also the key signal are supplied to a second multiplier 49. At the output of the second multiplier 49 a signal is thus produced that incorporates the correction space shown in FIG. 6B bounded in the direction of the color hue by means of the circuits 13, 14 and 15. From the output of the second multiplier 49 this signal is supplied to the multipliers 16, 17 and 18 of FIG. 1.

Although the invention has been described with reference to a particular illustrative example, it will be understood that variations and modifications are possible within the inventive concept.

We claim:

1. A method of color correction of a color television signal by reference to the color hue represented in the color television signal and reference to control magnitudes previously set into a color correction system, comprising the steps of;

storing, in at least one memory, correction signal values in a manner dependent on both said previously set control magnitudes and digital values of said color hue represented in said color television signal, said at least one memory including first and second memories;

reading out from storage in said at least one memory said correction signal values addressed by digital color hue values successively derived from said color television signal and said control magnitudes;

arithmetically combining said correction signal values with other signals derived from said color television signal in at lest one calculation circuit and thereby producing refined signal values;

after a first change of at least one of said control magnitudes has been selected by a person implementing the method, new correction signal values, provided in accordance with a new set of control magnitudes, are entered into said first memory while said second memory is being addressed by said digital color hue values and thereby provides previously stored correction signal values to said at least one calculating circuit, and after a second change of at least one of said control magnitudes following next after said first change, new correction signal values, provided in accordance with a new set of control magnitudes, are entered into said second memory while said first memory is addressed by said digital color hue values and thereby provides previously stored correction signal values to said at least one calculating circuit.

2. The method of claim 1, wherein said correction signal values stored in said at least one memory may have any selectable value within a predetermined value range.

3. The method of claim 2, wherein said selectable correction signal values are in accordance with a function of magnitude plotted against angular hue values of a color circle as coordinates, said function being entered into a computer as a set of corner point values for which the computer is programmed to provide lines connecting successive corner point values to complete the storage of a said function.

4. The method of claim 3, wherein the step of entering said corner point values among said selectable correction signal values is performed by designating for each corner point value a location having a corresponding hue value on a screen of a monitor display, and wherein for said corresponding hue value, the said control magnitudes to which said correction signal values correspond, are adjustable by manual setting of variable controls.

5. The method of claim 3, wherein the step of entering a said correction signal value for a said hue value into a computer is performed with reference to a monitor display screen by designating on said screen at one location thereof the hue for which a correction signal value is to be produced. and wherein the hue which should be obtained by said correction signal value is designated on said screen, at another location thereof, the values of said designated hues being supplied to said computer for computation of said correction signal value.

6. The method of claim 3, wherein the step of entering said corner point values into a computer is performed with reference to a monitor display screen by defining a range of hues designated by designating a plurality of locations on said screen, said designated range of hues defining hues for which said correction signal values are to be computed.

7. The method of claim 1, wherein a preliminary step is performed of deriving, from said color television signal, a digital hue signal, a digital saturation signal and a digital luminance signal, and wherein the steps of storing in memory and reading out from storage in memory correction signal values addressable by values of color hue represented in said color television signals are accompanied by similar steps for storing and reading out correction signal values addressable respectively by saturation and luminance values, whereby first, second and third sets of correction signal values are obtained for combining them arithmetically, respectively, with hue, saturation and luminance signals and thereby respectively producing corrected color hue, color saturation and luminance signals.

8. A method of color correction of a digital color television signal by reference to the color hue represented in the color television signal and to control magnitudes previously set into a color correction system, comprising the steps of:

deriving from said digital television signal a color hue signal, a color saturation signal and a luminance signal;

storing in respective first portions of first, second and third memories respective first, second and third correction signal values for respectively correcting said hue, saturation and luminance signals and reading out, from second portions of said respective three memories, previously stored first, second and third correction signal values respectively for hue, saturation and luminance values and supplying them to respective first, second and third calculation circuits for providing by addition in said first calculation circuit and by multiplication in said second and third calculation circuits respectively, color corrected hue, saturation and luminance signals at respective outputs of said first, second and third calculation circuits, said first and second portions of each of said first, second and third memories being controlled by said computer through changeover switching means to alternate the memory portions in function so that in each case after the step of storing raw correction signal values in said first portion of one of said memories is completed, the next read-out step is performed by reading out said first portion of said memory while the second portion of said memory is available for or used for storing new correction signal values subsequently furnished by said computer, and after a step of storing new correction signal values in said second portion of a said memory, the next step of reading out stored raw correction signal values is performed with respect to said first portion of the same memory, while said second portion of said memory is available or used for storing a subsequent set of correction signal values.

9. The method of claim 8, wherein after the step of reading out said correction signal values, said correction signal values are multiplied by control signals which are derived in a manually commandable way from said digital color television signal, from said hue signal, from said saturation signal, from said luminance signal, or from a key signal that controls the mixing of said digital control signal or in combination from two or more of the signals just mentioned.

10. The method of claim 9, wherein said control signals represent in each case a settable range of saturation, range of luminance or region of a picture, or two or more of said ranges and region, only within which said correction signal values are effective.

11. The method of claim 9, wherein, either inside or outside of said computer, additional correction signal values are stored which can be set independently of other raw correction signal values and wherein said additional correction signal values are multiplied with control signals that are inverted with respect to said control signals by which said correction signal values are multiplied, and wherein said multiplied correction signal values and said supplied additional correction signal values are added together.

12. An apparatus system for color correction of a digital color television signal by reference to the color hue represented in a digital color television signal and to control magnitudes entered into a computer manually comprising:

a computer having an entry array of manual controls for entering controlled magnitudes manually in said computer for supplying from said computer first, second and third sets of raw correction signal values for respectively correcting said hue, saturation and luminance signals;

first, second and third memories each having first and second read-write memory portions addressable by said hue signal through changeover switches controlled by said computer for reading out correction signal values from one portion of a said memory while the other portion of the same said memory is available or used for storing new correction signal values and for alternating the respective functions of said memory portions by means of said changeover switches whenever new correction signals are provided by said computer for the respective memory, said changeover switches being connected for addressing said memory portions by said computer for storage and by said hue signal for read-out, said respective read-out outputs of said first, second and third memories being connected during read-out to respective inputs of first, second and third calculation circuits to which respectively said hue, saturation and luminance signals are supplied for further correction to produce, respectively, refined hue, saturation and luminance signals.

13. The apparatus system of claim 12, wherein said first, second and third calculation circuits are arithmetic circuits not included in said computer.

14. The apparatus system of claim 12, wherein the operation of said changeover switches is controlled for each of said memories by a synchronizing circuit such that after a change of said correction signal values for one of said memories, operation of said changeover switches of that one memory takes place only at the beginning of a new picture field or only at the beginning of a new picture frame.

15. The apparatus system of claim 12, wherein first, second and third additional calculating circuits to each of which a key signal is supplied are interposed between the read-out outputs of said respective first, second and third memories and said respective first, second and third calculation circuits, for modification of said correction signal values with reference to said key signal.

16. The apparatus system of claim 12, wherein said computer (23) is provided with a controllable input gate (37) which is controllable by a cursor circuit (36) for writing in at least said digital color hue signal into the computer at an instant determined by a cursor position.

* * * * *